UNITED STATES PATENT OFFICE.

JOHN HARVEY KELLOGG, OF BATTLE CREEK, MICHIGAN.

BAKING-POWDER.

932,138.  Specification of Letters Patent.  Patented Aug. 24, 1909.

No Drawing.  Application filed August 21, 1905. Serial No. 275,039.

*To all whom it may concern:*

Be it known that I, JOHN HARVEY KELLOGG, a citizen of the United States, residing at the city of Battle Creek, county of Calhoun, State of Michigan, have invented certain new and useful Improvements in Baking-Powders, of which the following is a specification.

This invention relates to improvements in baking powders and self-raising flour, and the ingredients therefor. In the usual baking powder mixtures and self raising flour mixtures, some ingredient entirely foreign to the bread or cooked product is introduced, which, of course, is more or less objectionable.

I am aware that it has been heretofore attempted to utilize hydrochloric acid and bicarbonate of soda in a baking powder and I have regarded these ingredients as very desirable for the purpose, but there has been no practical way of utilizing the same so far as I am aware. To introduce the acid into the flour without further preparation has resulted in an injury to the flour by the attack of the acid upon the starch by the reaction of the acid preventing a proper distribution of the same and making such distribution practically impossible. The result of mixing the carbonate under such circumstances is to secure strong action at some points and scarcely any at others, the thing obviously to be avoided.

It is the object of this invention to provide an economical practical and convenient raising mixture which does not introduce into the finished product,—either bread, biscuit, or cake, any ingredient other than that which naturally occurs there, the ingredient added as the result of applying this invention being merely sodium chlorid, or common salt, an ingredient quite universally added to food.

Other objects, relating to the details, will appear from the description to follow.

I accomplish the objects of my invention by the devices and means described in the following specification.

The invention is clearly defined and pointed out in the claims.

I first take gluten, which has been prepared from wheat or other cereal—preferably wheat, however, which is as pure and free from starch as it is possible to obtain it by the ordinary methods of manufacture. To this I add hydrochloric acid in proportion of one part of weight of the acid to four parts of the gluten. After the mass has been thoroughly mixed, I allow it to stand for a few hours. The solution of hydrochloric acid used is of the full strength sold as chemically pure by the druggist or dealer. However, the full strength " commercial " acid, as it is called, would serve the purpose, although, of course, there are likely to be some impurities in it. A longer or shorter period is sometimes required. At the end of this period the gluten becomes dry and the acid is thoroughly absorbed into the same, and, so far as I am able to judge, enters into an unstable chemical union therewith. This I will denominate acid-gluten. I then mix this acid gluten with a quantity of flour or starch, when the same is to be used in baking powder.

For another ingredient of the baking powder or self raising flour, I take bicarbonate of soda, in the proportion of four pounds of soda to each five pounds of hydrochloric acid that was used in the preparation of the acid-gluten mixture, and add to this a quantity of ordinary wheat flour or starch sufficient to prevent chemical union or action between the soda and the acid-gluten when the two are mixed together. Experience shows that the addition of soda directly to the acid-gluten results, in a comparatively short time, in chemical action between the acid and the soda, liberating carbonic acid gas and so destroying the raising power of the mixture.

The proportion of starch or flour required will depend upon the dryness of the mixture and the manner in which the mixture is to be preserved. If kept perfectly dry, the proportion of flour or starch may be less than if preserved under ordinary atmospheric conditions. We find that a mixture in which the amount of flour employed is twice the weight of the acid gluten, keeps well. The flour or starch, to resist the chemical action, may be divided between the soda and the acid-gluten mixture, or all may be admixed with the acid-gluten. This mixing the flour with the acid gluten is of advantage, first, because the flour, if thoroughly dry, will assist in absorbing any residue of moisture which may remain in the acid-gluten; second, it gives an opportunity for the gluten in the flour to absorb and react with any remaining portion of the free acid which might exist uncombined or unabsorbed by the gluten. This bicarbonate of soda mixture and the acid-gluten mixture may be mixed with a comparatively small proportion of flour, and a portion thereof may then be added to a larger portion of flour and admixed therewith and water added, and in that way be used the same as ordinary baking powder.

The very best results, however, will be obtained by a thorough admixture of the acid-gluten containing five pounds of hydrochloric acid with 600 to 700 pounds of flour, and to this mixture should be added four pounds of bicarbonate of soda, and the whole thoroughly and evenly mixed. This mixture can simply be stirred up with water, and the carbonic acid gas developed from the reaction of the hydrochloric acid and bicarbonate of soda will aerate this amount of flour. The resulting chemical compound from the reaction will be merely a little salt, and to season to the average taste it will be necessary to add a further amount of salt. The acid-gluten and bicarbonate of soda can be mixed with a much smaller amount of flour than I have here indicated, and be added to ordinary flour according to direction. The addition of the gluten to the flour enriches the bread and makes the same a more fit health food for diabetics and other invalids.

I desire to remark that the acid-gluten as I have described it, admixed, is the base of my invention, and that the same could be prepared and could be stirred into flour in which bicarbonate of soda had been mixed by the housewife or bread maker; whereupon, on the addition of water a proper and satisfactory aerated bread or loaf would be produced. It can be used with other suitable carbonates as saleratus.

The self-raising mixture is adapted for use with corn flour, buckwheat flour, barley flour, rye flour, rice flour, oatmeal, potato flour, and other farinaceous products. The proportions I have given could be increased, which would, of course, increase the volume of carbonic acid gas liberated, and by using a smaller amount, less aeration will be secured.

My improved mixture is applicable and desirable for use in a self-raising flour, not only for bread making, but for the making of sweet cakes, griddle cakes, dumplings, and any other foods in which aeration is desirable. It could, of course, be effectively used where eggs are introduced into the food.

Having thus described my invention, what I claim as new and desire to secure by Letters Patent is:—

1. A raising mixture consisting of dry gluten powder impregnated with hydrochloric acid and combined therewith admixed with flour and bicarbonate of soda.

2. A raising mixture consisting of dry gluten powder impregnated with hydrochloric acid and combined therewith, and bicarbonate of soda, with an inert retarding powder, as flour or starch.

3. A raising mixture consisting of dry powdered gluten impregnated and combined with hydrochloric acid, admixed with flour and a suitable carbonate.

4. A raising mixture consisting of dry gluten powder impregnated with hydrochloric acid and combined therewith, and a suitable carbonate, with an inert retarding powder, as flour or starch.

5. The process of preparing a raising mixture, consisting in treating gluten with hydrochloric acid until the gluten becomes impregnated therewith, drying the same, admixing flour therewith, and adding bicarbonate of soda.

6. The process of preparing a raising mixture, consisting in treating gluten with hydrochloric acid, reducing the same to a powder, admixing flour therewith, and adding a suitable carbonate.

In witness whereof, I have hereunto set my hand and seal in the presence of two witnesses.

JOHN HARVEY KELLOGG. [L. S.]

Witnesses:
  Mrs. L. C. PARSHALL,
  NEWTON K. SHELDEN.